March 30, 1943.  W. KARRER ET AL  2,315,336

HEAT POWER PLANT

Filed April 26, 1939  5 Sheets-Sheet 1

Werner Karrer,
François Perrenoud,
INVENTORS,

BY Benjamin Roman
ATTORNEY

March 30, 1943.   W. KARRER ET AL   2,315,336
HEAT POWER PLANT
Filed April 26, 1939   5 Sheets-Sheet 2

Werner Karrer,
François Perrenoud,
INVENTORS,
BY Benjamin Roman.
ATTORNEY

Werner Karrer,
François Perrenoud,
INVENTORS,
BY Benjamin Roman,
ATTORNEY

March 30, 1943. W. KARRER ET AL 2,315,336
HEAT POWER PLANT
Filed April 26, 1939 5 Sheets-Sheet 5

INVENTORS,
Werner Karrer,
François Perrenoud,
BY
Benjamin Roman.
ATTORNEY

Patented Mar. 30, 1943

2,315,336

UNITED STATES PATENT OFFICE 2,315,336

HEAT POWER PLANT

Werner Karrer and François Perrenoud, Zurich, Switzerland, assignors to Maschinenfabrik Oerlikon, Oerlikon, Switzerland, a corporation of Switzerland Application April 26, 1939, Serial No. 270,082
In Switzerland April 30, 1938

22 Claims. (Cl. 60—44)

In a combustion product power plant which is operated by heat being supplied to a working substance at constant volume before it performs work in the prime mover, and withdrawn under constant pressure after it has performed work in the prime mover, while at least part of the heat withdrawn under constant pressure is employed to furnish part of the heat supplied at constant volume, combustion may be provided for after preheating at constant volume.

The idea to effect combustion by steps, for example by igniting again at the end of each period of preheating, produces all the drawbacks of a periodically working ignition device and brings about a sudden rise in pressure, which stresses the materials to their detriment. To obtain therefore as uniform and as good a combustion as possible, the invention makes use of mechanically precompressed fresh air, the precompression pressure drop of which is converted again into mechanical work in a special gas turbine, and said air, after being preheated in the constant volume chamber closed to the outside, that is to say, in the space in which the rise in pressure takes place by means of exchange heating, is burned in a combustion chamber which is connected to and communicates with at least a part of the constant volume chamber and in which there is maintained at least at one point a temperature above the ignition temperature of the fuel-air mixture so as to insure the ignition thereby of the fuel-air mixture that is introduced. The temperature above the ignition temperature may be maintained by means of one or several burning flames, by sparks, ignition bodies, ignition wires and the like. In the case of certain connecting systems a flame burning constantly while the power producing elements continue operating under load may be utilized.

The annexed drawings show diagrammatical examples of embodiments of the subject matter of the present invention.

Figure 1:
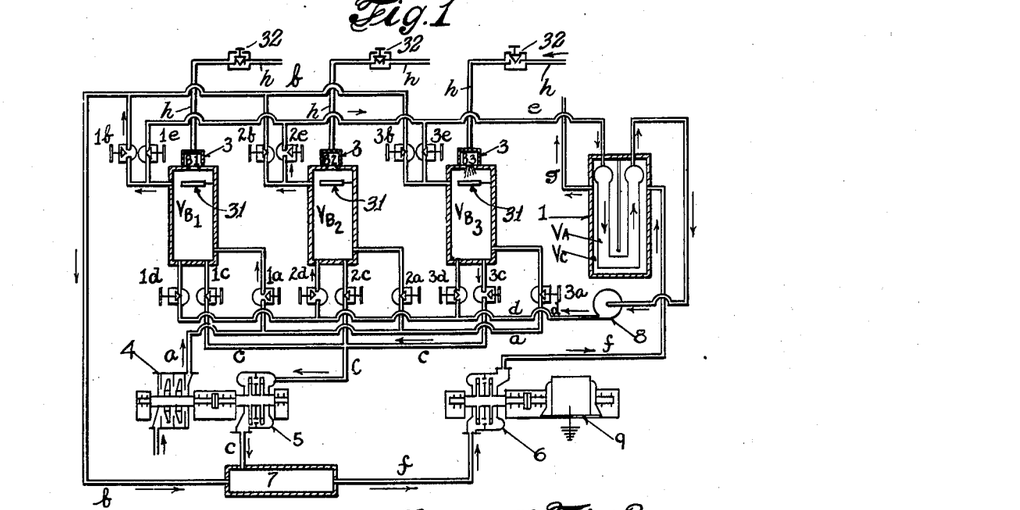
Fig. 1 is a diagrammatic layout showing a heat power plant constituting the invention, and illustrating one of the phases in the alternate operation of its power producing medium containers.
Figure 2:
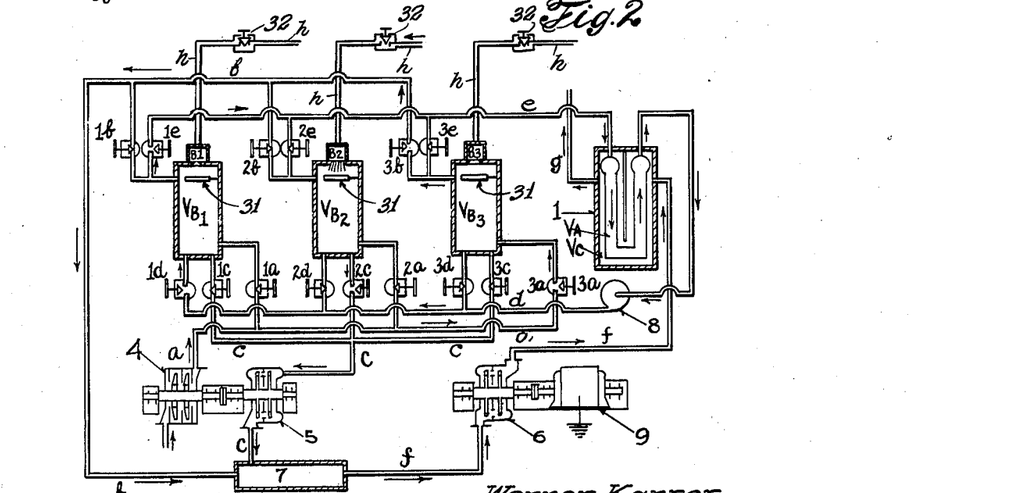
Figs. 2 and 3 are views similar to that shown in Fig. 1, but illustrating the remaining phases of said operation.
Figure 3:
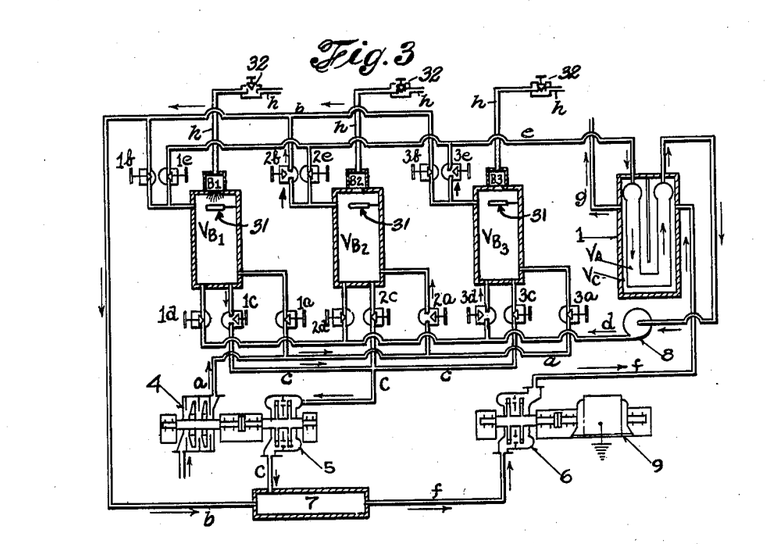

In the diagram of Figs. 1 to 3, several containers $V_{B_1}$, $V_{B_2}$, $V_{B_3}$ are provided for the exchange heating on the counter current principle, which containers are filled, heated and emptied alternately in succession and are connected to communicate with each other in each heating period with the chamber $V_A$ of the exchanger 1, forming each together with $V_A$ the constant volume chamber.

In the first place, the container $V_{B_1}$ is in the scavenging and filling period (Fig. 1). A compressor 4 then conveys fresh air into the container $V_{B_1}$ through pipe $a$ across the valve $1a$ and simultaneously scavenges, through the valve $1b$ and the pipe $b$, the remaining hot air from the container $V_{B_1}$ to the collecting chamber 7. After the container $V_{B_1}$ has been filled, the valves $1a$ and $1b$ are closed and the valves $1d$ and $1e$ opened (Fig. 2), the fresh air being now conveyed by means of a blower 8 through the valve $1e$ and the pipe $e$ to the chamber $V_A$ of the exchanger and thence returned through the pipe $d$ to the valve $1d$ and the container $V_{B_1}$. As heat is absorbed in the exchanger division $V_A$ at the constant volume $V_A$ an $V_{B_1}$, an increase in temperature and pressure results in the constant volume $V_A$ and $V_{B_1}$.

Following the preheating by supplying heat to the chamber $V_A$, an additional supply of heat by the burning of the fuel-air in a combustion chamber is now to take place. This supplying of heat may take place either during the preheating, or after the termination of the heat supply by exchange preheating, i. e., after closing the valves $1d$ and $1e$, or in the subsequent expansion period. The spatial arrangement of the combustion chamber is provided for in a different manner, depending on the period in which combustion is to take place, as will be hereinafter shown. In Figs. 1, 2, 3 it is indicated that the combustion chamber forms a communicating part of the chamber $V_B$.

After the termination of the circulation period the valves $1d$ and $1e$ are closed and, following this or perhaps after the expiration of an interposed combustion period, the valve $1c$ is opened (Fig. 3), whereupon the products of combustion empty by way of conduit $c$ into the prime mover 5, which may be a gas turbine for example, and perform expansion work therein. The waste gases of the turbine 5 reach for example the collecting chamber 7, where they encounter the scavenge gases flowing through the pipe $b$, which gases come from the container which at the moment is in the period of scavenging and filling. (In Fig. 3 from the container $V_{B_2}$.) From the collecting chamber 7 the waste gases of the turbine 5 together with the scavenge gases of the container just being scavenged, reach the gas turbine 6 by way of conduit $f$, where they perform additional work, and finally flow through the chamber $V_C$ of the exchanger 1, where they give off part of the residual heat to the division $V_A$ of the constant volume space. Finally the waste gases escape through the pipe $g$. The turbines 5 and 6 drive for example the compressor 4 and the generator 9.

In the containers $V_{B_1}$, $V_{B_2}$, $V_{B_3}$, the periods of filling, heat absorption at constant volume and evacuation alternate. Fig. 1 represents the period in which $V_{B_1}$ is being scavenged and filled, $V_{B_2}$ is connected to the exchanger for the purpose of absorbing heat, and expansion takes place in $V_{B_3}$.

Figs. 2 and 3 show the other two phases.

Figure 4:
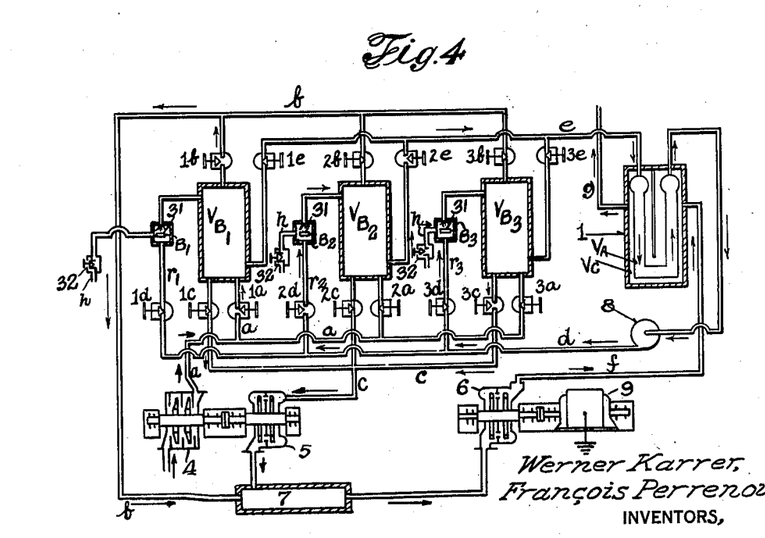
Figs. 4, 5, 6 are diagrammatic layouts showing a heat power plant which is a modification of the invention, but illustrating it with three different modes of utilizing its combustion period.
Figure 5:
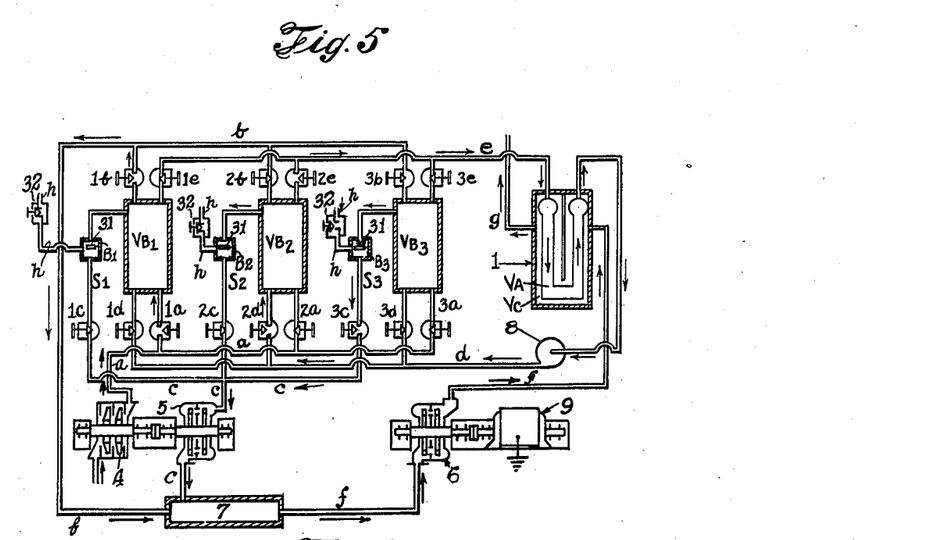
Figure 6:
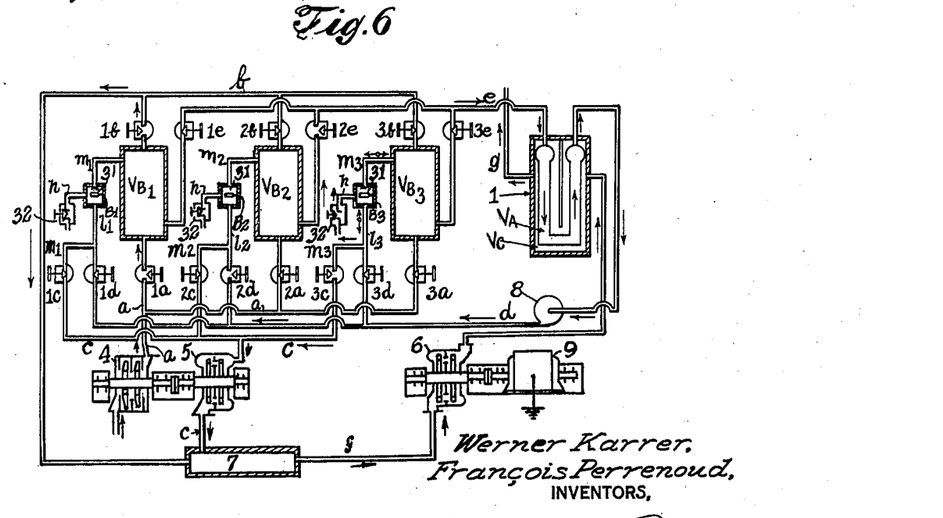

Whereas it is only indicated in Figs. 1 to 3 that a combustion chamber $B_1$, $B_2$, $B_3$ communicates with each container $V_{B_1}$, $V_{B_2}$, $V_{B_3}$, Figs. 4, 5 and 6 show sections of a plant according to Fig. 1, which represent special arrangements of the combustion chambers $B_1$, $B_2$, or $B_3$ communicating with the containers $V_{B_1}$, $V_{B_2}$, or $V_{B_3}$.

In Fig. 4 the combustion chambers $B_1$, $B_2$, $B_3$ are located in the lines $r_1$, $r_2$, $r_3$, through which flows the preheated air coming from the exchange chamber $V_A$ through pipe $d$ during the heat absorption period in which the appropriate valves $1d$ and $1e$, or $2d$ and $2e$, or $3d$ and $3e$ are open. In Fig. 4 the container $V_{B_2}$ is in the heat absorption period, as in Fig. 1, the valves $2d$ and $2e$ being therefore open, while the container $V_{B_1}$ is scavenged through the valve $1b$ and filled from $a$ with precompressed fresh air. Expansion takes place in $V_{B_3}$ by way of $c$. Therefore, the constant volume chamber, during the period represented in Fig. 4, consists of the appropriate connecting pipes and the container $V_{B_2}$, the exchanger division $V_A$ and the combustion chamber $B_2$. The mechanically precompressed air which is in $V_{B_2}$ from the filling period is returned, by means of the blower 8, from $V_{B_2}$ across the open valve $2e$, the pipe $e$, the exchanger chamber $V_A$ (which may consist of the interior of a nest of tubes), the pipe $d$ and the open valve $2d$ to the combustion chamber $B_2$ and thence in the form of gas with any desired excess of air to the container $V_{B_2}$. During this operation the air is preheated in $V_A$ and at least partly burned in $B_2$. When the container $V_{B_2}$ has been filled up with sufficient air which has been thus conveyed, heated, and burned in this circulation, the valves $2d$ and $2e$ are closed, and the contents of $V_{B_2}$ which has undergone an increase in temperature and pressure through heat absorption in $V_A$ and combustion in $B_2$, is ready for expansion. There then follows for the container $V_{B_2}$ the period of expansion, while $V_{B_1}$ enters the heat absorption period. The action of the various periods is repeated, as was described with reference to Figs. 1 to 3.

Fig. 5 shows another position of the combustion chambers $B_1$, $B_2$, $B_3$ which, though communicating again with the containers $V_{B_1}$, $V_{B_2}$, $V_{B_3}$, are situated in the pipe line sections $s_1$, $s_2$, $s_3$, through which flow, in each period of expansion, the gases which flow through the valves $1c$ (or $2c$, $3c$ respectively) and the pipe $c$ to the turbine 5. Fig. 5 represents the same period shown in Fig. 1 and Fig. 4. Expansion takes place in the container $V_{B_3}$, which has been preheated, as seen in Fig. 3, by being connected to $V_A$ and by the circulation of the air content, with the chamber closed to the outside. The air flows through the combustion chambr $B_3$ only during expansion, and burns there at least partly before it is admitted to the turbine 5 across the open valve $3c$ and the pipe $c$. Therefore, in this arrangement combustion occurs not before the expansion period.

In Fig. 6 the combustion chambers $B_1$, $B_2$, $B_3$, which again communicate with $V_{B_1}$, $V_{B_2}$, and $V_{B_3}$ respectively, are located in a section of line $l_1m_1$ or $l_2m_2$, $l_3m_3$ forming the common supply pipe to the valves $1c$, $1d$ or $2c$, $2d$ or $3c$, $3d$. It will be readily observed that in this arrangement the combustion chambers carry a stream of fluid both during the heat absorption period and in the expansion period. As Fig. 6 represents again the same condition of time as Figs. 1, 4 and 5, the container $V_{B_2}$ is in the period of heat absorption, i. e., the air is conveyed, by means of the blower 8, through the valve $2e$, the pipe $e$, the exchanger chamber $V_A$, the pipe $d$ and the valve $2d$ to the combustion chamber $B_2$ and partly burned there, to be returned to the container $V_{B_2}$ in the form of a gas with an abundant excess of air. Such partly burned gas is present in $V_{B_3}$ from the preceding period, which in the period represented now flows through the combustion chamber $B_3$, the valve $3c$ and the pipe $c$ to the turbine 5, where it performs work. In the combustion chamber $B_3$ additional portions of air are burned, the excess of air on entering the turbine 5 being thus smaller than when leaving $V_{B_3}$. The cycle of the various periods of scavenging and filling, of absorbing heat during the circulation through the exchanger and the combustion chamber, and of expansion through the combustion chamber and turbine again occurs as described with reference to Figs. 1 to 3. In the heat absorption period a rise in pressure and temperature takes place in consequence of heat being supplied to a chamber closed to the outside.

Since the combustion chambers $B_1$, $B_2$, $B_3$ remain in communication with the proper containers $V_{B_1}$, $V_{B_2}$, $V_{B_3}$, care must be taken that no substantial amounts of fresh air are burned during the non-appropriate time of combustion, especially during the period in which the chambers $V_B$ are filled with fresh air (from the pipe $a$). This may be effected by throttling the fuel supply, by means of any usual devices or valves 32, in lines $h$ leading to the combustion chambers. In Figs. 4, 5, 6, moreover, the fresh air supply is so conducted that the fresh air does not flow through the combustion chamber. In combustion chambers $B_1$, $B_2$, $B_3$ there is maintained simultaneously a temperature above the temperature of ignition of the fuel-air mixture by means of one or several flames, sparks, ignition bodies, ignition wires and the like, for the fuel-air mixture to be ignited thereby, as indicated by ignition plates 31, Figs. 1 to 6.

Of course, during the period of combustion the fuel supply must always be raised to the nominal value, with the result that a periodically variable fuel supply is established. This mode of operation is changed by the second arrangement described in the following lines and is an improvement because the operation may be carried out with constant flames.

Figure 7:
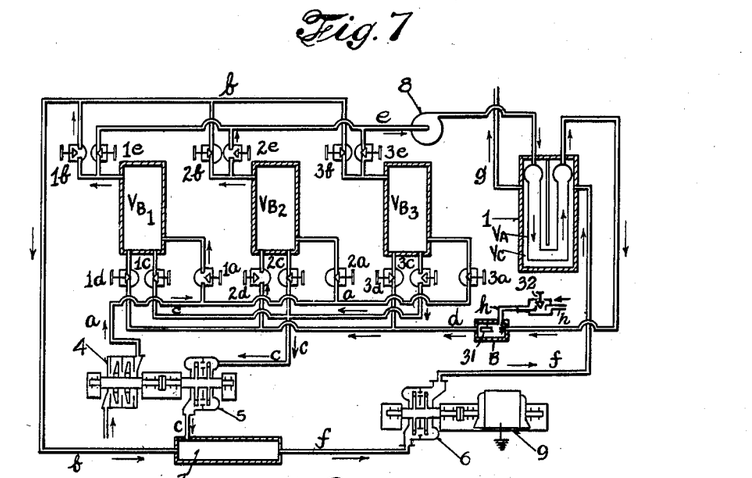
Figs. 7 and 8 are diagrammatic layouts showing heat power plants constituting other modifications of the invention.

Such an arrangement is shown in Fig. 7, where the combustion chamber B is located on the exchanger side of the valves 1d, 2d, 3d, i. e., directly in series with the exchanger part $V_A$. Therefore, only one combustion chamber need be provided, and is connected together with the chamber $V_A$ successively alternately to the various chambers $V_B$ by actuating the valves 1d, or 2d, or 3d and 1e, or 2e, or 3e, the valves 1d and 1e each being open only in the preheating period (which in this case is simultaneously the combustion period) of the container $V_{B_1}$, the valves 2d and 2e in that of the container $V_{B_2}$, and the valves 3d, 3e in that of the container $V_{B_3}$. Fig. 7 represents the same state as in Figs. 1, 4, 5 and 6, namely the period in which scavenging and filling occurs in $V_{B_1}$, the absorption of heat (circulation) in $V_{B_2}$, and expansion in $V_{B_3}$. The other states may be readily reconstructed.

The operations here described with reference to the container $V_{B_1}$ are the following:

After filling the chamber $V_{B_1}$ by means of the compressor 4, the pipe a and the valve 1a and simultaneously scavenging the residual gases through the valve 1b and the pipe b into the collecting chamber 7, the valves 1a and 1b are closed and the valves 1d and 1e opened. By means of the blower 8, which in this case is mounted for example in the pipe line e, the fresh air is conveyed from the chamber $V_{B_1}$ through the valve 1e and the pipe e to the preheating chamber $V_A$ where it takes up heat by exchange at constant volume, and then through the combustion chamber B, where the combustion takes place, to be returned to the chamber $V_{B_1}$ across the pipe d and the value 1d. After circulating the desired amount of fresh air of the chamber $V_{B_1}$, that is to say, after filling the chamber $V_{B_1}$ with the desired amount of combustion gases, the valves 1d and 1e are closed again and the valve 1c is opened, which makes it possible for the expansion to take place in the turbine 5, the waste gases of the turbine meeting in the collecting chamber 7 with the scavenge gases from the container that is being scavenged. The further path of the gases is the same as described in Fig. 1.

The containers $V_{B_2}$ and $V_{B_3}$ again cooperate with $V_{B_1}$ in such a manner that they pass alternately and successively through the periods of scavenging, heat absorption and expansion, as was described with reference to Figs. 1, 2 and 3.

During the period of heat absorption the contents of the container is circulated as before through the exchanger and the combustion chamber by means of blower 8. The constant volume chamber here consists alternately of the chambers $V_A+B+V_{B_1}$ or $V_A+B+V_{B_2}$ or $V_A+B+V_{B_3}$; the spaces $V_A+B$ are in each period part of the constant volume chamber. The blower 8 operates continuously. The waste gases of the turbine 6 (which for the rest describe for example the same circuit described in Fig. 1) flow continuously through chamber $V_C$. A flow of air and gas is also constantly present in the chambers $V_A$ and B, with the exception of the perturbations caused by switching from one chamber to the next, which makes it possible for a flame to burn continuously under load in the combustion chamber B, without having to run without load for long intervals as in the case of Fig. 1. In this case it is therefore not necessary to adjust periodically the fuel supply to the combustion chamber.

It may often be found advantageous to give up part of the heat delivered to the chamber $V_A$ and B to a cooling chamber outside, thus not employing it for the purpose of expansion in the turbine. Particularly the delivery of heat to a steam power system is here considered, preferably by heat exchange in a boiler, superheater or feeder heater.

Figure 8:
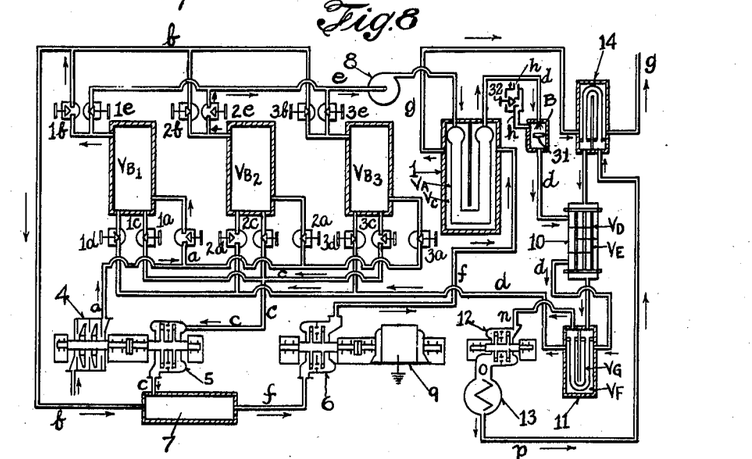

We must emphasize in particular the case illustrated by Fig. 8, where the cooling chamber $V_D$ together with the chamber $V_A$ and B is in each case connected to the various containers $V_B$.

Fig. 8 differs from Fig. 7 in that the part of the constant volume chamber which is alternately connected to the various chambers $V_B$ and forms in each period part of the constant volume chamber, does not consist only of the exchanger chamber $V_A$ and the combustion chamber B, but has connected to said two chambers cooling chambers $V_D$ and $V_F$, in which a portion of the previously delivered heat is given up to the outside, i. e., to the chambers $V_E$ and $V_G$.

Therefore, during the period of circulation the fresh air of the container $V_B$ that may be connected is in this case circulated by means of the blower 8 successively through the chambers $V_A$, B, $V_D$, and $V_F$, in order to take up exchange heat in $V_A$, to be burned in B and to give up again part of the heat in $V_D$ and $V_F$ to $V_E$ and $V_G$ and to be returned to the chamber $V_B$ with the outlet temperature of $V_F$. All the chambers $V_A$, B, $V_D$ and $V_F$ are here collectively and alternately connected to the various chambers $V_B$ and disconnected from them. For example, in $V_D$ and $V_F$ the heat is given up to water steam, which is vaporized in $V_E$, is superheated in $V_G$, (boiler 10, superheater 11) is expanded in the steam turbine 12, liquefied in the condenser 13, and preheated in the feed water heater 14 by the waste gases.

Of course, any live heat sources may likewise be employed for the purpose of vaporization or superheating.

Figure 9:
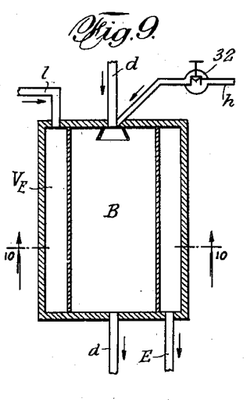
Fig. 9 is a cross-sectional elevation, showing a modified form of the combustion chamber of the invention.
Figure 10:
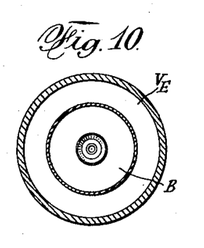
Fig. 10 shows a transverse-sectional bottom plan view of the combustion chamber in Fig. 9, taken on line 10—10 thereof.
Figure 11:
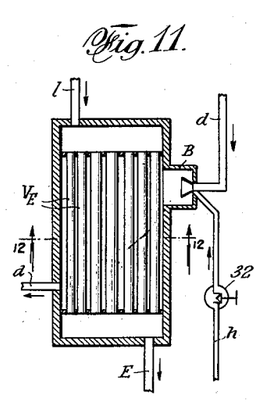
Fig. 11 is a cross-sectional elevation, showing a modified form of the heat exchanger of the invention.
Figure 12:
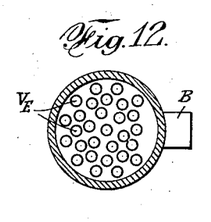
Fig. 12 shows a transverse-sectional bottom plan view of the heat exchanger in Fig. 11, taken on line 12—12 thereof.
Figure 13:
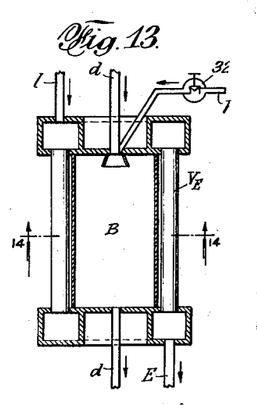
Fig. 13 is a cross-sectional elevation, showing another modification of the combustion chamber of the invention.
Figure 14:
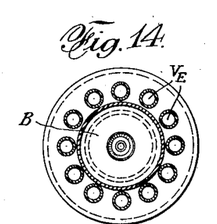
Fig. 14 shows a transverse-sectional bottom plan view of the combustion chamber in Fig. 13, taken on line 14—14 thereof.

Refrigeration may also be effected in the combustion chamber itself, as indicated in Figs. 9 to 14, inclusive. Figs. 9, 10 show a combustion chamber B concentrically surrounded by the cooling chamber $V_E$. In Figs. 11, 12, the cooling pipes $V_E$ lead through the interior of the combustion chamber B, while in Figs. 13, 14, concentrically arranged cooling pipes $V_E$ are provided around the combustion chamber B. In all these cases the maximum temperature of the combustion chamber is kept at lower values.

Therefore, the arrangement of the combustion chamber B in series with the exchanger member $V_A$ gives the result that a single combustion chamber only may be employed for several $V_B$ chambers, and that a continuous flame can be maintained in said combustion chamber without any periodical fuel adjustment, which flame must never work without load.

While in the case where the combustion chambers are designed as divisions of the container $V_B$ it is possible, by arranging their position or the pipes and valves (1c, 2c, 3c) leading to the turbine 5, to obtain the result that heat is delivered also during the period of expansion, Figs. 6 and 7, the same effect can also be produced where the combustion chamber is in series with $V_A$, by releasing the path to the turbine through opening the valve 1c (or 2c, 3c) before separating the chamber $V_A$ and B from the connected chamber $V_{B_1}$ (or $V_{B_2}$, $V_{B_3}$) by closing the valve 1d and 1e (or 2d and 2e, or 3d and 3e). Supplying heat during expansion offers the advantage that it is then possible to move the expansion from the purely adiabatic region toward the isothermal region and even toward the region of constant pressure. If a turbine is provided as the prime mover 5, it may be an advantage to supply during expansion just enough heat to insure constant speed of expansion over a maximum range of the expansion period so that the blade angles remain the most suitable with respect to the resulting speeds over this whole period of time. The early opening of the turbine valve may of course be employed for example also in the case of Fig. 4, for the purpose of supplying additional heat.

Figure 15:
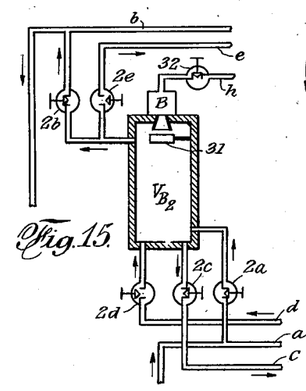
Figs. 15 and 16 are fragmentary diagrammatic layouts showing the power plant in different phases.
Figure 16:
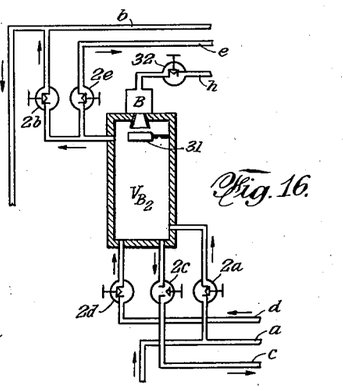

Figs. 15, 16, represent the container $V_{B_2}$ together with its valves, and show the position of the valves in succession during the transition from the heat absorption to the period of expansion in the case where combustion is still to take place during expansion.

Fig. 15 shows the container $V_{B_2}$ in the heat reception period, the valves 2d and 2e being open, the other valves being closed.

Fig. 16 shows the container $V_{B_2}$ in the period of expansion after closing the valves 2d and 2e, the only open valve being 2c.

In all the examples a combustible gas could replace the fresh air, and an oxygen carrier could replace the fuel.

Variations may be resorted to within the scope of the invention, and portions of the improvements may be used without others.

Having thus described our invention, we claim:

1. In a combustion product power plant, the combination of a container for a working substance, a heat exchanger having a closed heat receiving receptacle, means for scavenging said container of previously burned substance therein and refilling it with a fresh charge of said working substance in a precompressed state, means to circulate said compressed substance of said container through said receptacle for preheating it, means to arrest said circulation, a combustion device for said container for additionally heating within the container said compressed substance, and means to discharge said combustibly heated contents of said container for expansion for a subsequent said scavenging and refilling of the container.

2. In a combustion product power plant, the combination of a container for a working substance, a heat exchanger having a closed heat receiving receptacle, means for scavenging said container of previously burned substance therein and refilling it with a fresh charge of said working substance, means to circulate said substance of said container through said receptacle for preheating it, means to arrest said circulation, a combustion device for said container for additionally heating within the container said substance, and means to discharge said combustibly heated contents of said container for expansion for a subsequent said scavenging and refilling of the container.

3. In a combustion product power plant, the combination of a container for a working substance, a heat exchanger having a closed heat receiving receptacle, means for scavenging said container and filling it with said substance, means to circulate said substance of said container through said receptacle for preheating it, means to arrest said circulation, a combustion device for said container for additionally heating said substance, means to discharge said combustibly heated substance of said container for expansion, a collecting chamber, means to conduct the scavenged substances from said container to said chamber, and means to conduct the contents of said chamber into said exchanger.

4. In a combustion product power plant, the combination of a container for a working substance, a heat exchanger having a closed heat receiving receptacle, means for scavenging said container and filling it with said substance, means to circulate said substance of said container through said receptacle for preheating it, means to arrest said circulation, a combustion device for said container for additionally heating said substance, means to discharge said combustibly heated contents of said container for expansion, a collecting chamber, means to conduct the scavenged substances from said container to said chamber, a prime mover driven by said discharged contents from said container, means to conduct the scavenged substances from said prime mover into said chamber, and means to discharge the contents of said chamber for expansion.

5. In a combustion product power plant, the combination of a container for a working substance, a heat exchanger having a closed heat receiving receptacle, means for scavenging said container of previously burned substance therein and refilling it with a fresh charge of said working substance, means to circulate said substance of said container through said receptacle for preheating it, means to arrest said circulation, a combustion device for said container for additionally heating within the container said substance, means to discharge said combustibly heated substance from said container for expansion for a subsequent said scavenging and refilling of the container, a collecting chamber, means to conduct the scavenged substance from said container to said chamber, and a prime mover driven by the contents of said chamber.

6. In a combustion product power plant, the combination of a container for a working substance, a heat exchanger having a closed heat receiving receptacle, means for scavenging said container and filling it with said substance, means to circulate said substance of said container through said receptacle for preheating it, means to arrest said circulation, a combustion device for said container for additionally heating said substance, means to discharge said combustibly heated substance from said container for expansion, a collecting chamber, means to conduct the scavenged substance from said container into said chamber, and a prime mover driven by the contents of said chamber and exhausting into said exchanger.

7. In a combustion product power plant, the combination of a plurality of containers for a working substance, a heat exchanger having a closed heat receiving receptacle, means for alternately scavenging each of said containers of previously burned substance therein and refilling it with a fresh charge of said working substance in a precompressed state, means to alternately circulate said precompressed substance from each of said containers through said receptacle for preheating it, means to alternately arrest said circulation, a combustion device for each of said containers for additionally heating within the containers said precompressed substance, and means to alternately discharge said combustibly heated contents of each of said containers for expansion for a subsequent said scavening and refilling of the container.

8. In a combustion product power plant, the combination of a plurality of containers for a working substance, a heat exchanger having a closed heat receiving receptacle, means for alternately scavenging each of said containers of previously burned substance therein and refilling it with a fresh charge of said working substance, means to alternately circulate said substance from each of said containers through said receptacle for preheating it, means to alternately arrest said circulation, a combustion device for each of said containers for additionally heating within the container said substance, and means to alternately discharge said combustibly heated contents of each of said containers for expansion for a subsequent said scavenging and refilling of the container.

9. In a combustion product power plant, the combination of a container for a working substance, a heat exchanger having a closed heat receiving receptacle, a conduit leading from said container to said receptacle, a return conduit leading from said receptacle to said container, means for scavenging said container and filling it with said substance, means to circulate said substance from said container through said conduits and receptacle for preheating it, means to arrest said circulation, a combustion device for said container located in said return conduit for additionally heating said substance, and means to discharge said combustibly heated contents of said container for expansion.

10. In a combustion product power plant, the combination of a container for a working substance, a heat exchanger having a closed heat receiving receptacle, a conduit leading from said container to said receptacle, a return conduit leading from said receptacle to said container, means for scavenging said container of previously burned substance therein and refilling it with a fresh charge of said working substance, means to circulate said substance from said container through said conduits and receptacle for preheating it, means to arrest said circulation, a conduit for discharging said preheated contents of said container for expansion for a subsequent said scavenging and refilling of the container, and a combustion device located in said discharging conduit for additionally heating said discharging contents.

11. In a combustion product power plant, the combination of a container for a working substance, a heat exchanger having a closed heat receiving receptacle, a conduit leading from said container to said receptacle, a return conduit leading from said receptacle to said container, means for scavenging said container and filling it with said substance, means to circulate said substance from said container through said conduits and receptacle for preheating it, means to arrest said circulation, a conduit for discharging the contents of said container for expansion, and a combustion device for additionally heating said contents being so connected to said return conduit and to said discharging conduit that it will function during said circulation and during said discharge of said contents.

12. In a combustion product power plant, the combination of a plurality of containers for a working substance, a heat exchanger having a closed heat receiving receptacle, a conduit for each of said containers leading therefrom to said receptacle, a return conduit for each of said containers leading thereto from said receptacle, means for alternately scavenging each of said containers and filling it with said substance, means to alternately circulate said substance from each of said containers through said conduits and receptacle for preheating it, means to alternately arrest said circulation, a combustion device in a conduit leading from said receptacle to each of said return conduits for additionally heating said substances in each of said containers during said circulations, and means to alternately discharge said combustibly heated contents of each of said containers for expansion.

13. In a combustion product power plant, the combination of a plurality of containers for a working substance, a heat exchanger having a closed heat receiving receptacle, a conduit for each of said containers leading therefrom to said receptacle, a return conduit for each of said containers leading thereto from said receptacle, means for alternately scavenging each of said containers and filling it with said substance, means to alternately circulate said substance from each of said containers through said conduits and receptacle for preheating it, means to alternately arrest said circulation, a combustion device in a conduit leading from said receptacle to each of said return conduits for additionally heating said substances in each of said containers during said circulations, said combustion device including a continuously functioning heated body for maintaining said substances thereat in continuous combustion, and means to alternately discharge said combustibly heated contents of each of said containers for expansion.

14. In a combustion product power plant, the combination of a plurality of containers for a working substance, a heat exchanger having a closed heat receiving receptacle, a conduit for each of said containers leading therefrom to said receptacle, a return conduit for each of said containers leading thereto from said receptacle, means for alternately scavenging each of said containers and filling it with said substance, means to alternately circulate said substance from each of said containers through said conduits and receptacle for preheating it, means to alternately arrest said circulation, a combustion device in a conduit leading from said receptacle to each of said return conduits for additionally heating said substances in each of said containers during said circulations, means to alternately discharge said combustibly heated contents of each of said containers for expansion, and means to withdraw heat from said combustion chamber.

15. In a combustion product power plant, the combination of a plurality of containers for a working substance, a heat exchanger having a closed heat receiving receptacle, a conduit for each of said containers leading therefrom to said receptacle, a return conduit for each of said containers leading thereto from said receptacle, means for alternately scavenging each of said containers and filling it with said substance, means to alternately circulate said substance from each of said containers through said conduits and receptacle for preheating it, means to alternately arrest said circulation, a combustion chamber in a conduit leading from said receptacle to each of said return conduits for additionally heating said substances in each of said containers during said circulations, means to withdraw heat from said combustion chamber, and means to alternately discharge said combustibly heated contents of each of said containers for expansion.

16. In a combustion product power plant, the combination of a plurality of containers for a working substance, a heat exchanger having a closed heat receiving receptacle, a conduit for each of said containers leading therefrom to said receptacle, a return conduit for each of said containers leading thereto from said receptacle, means for alternately scavenging each of said containers and filling it with said substance, means to alternately circulate said substance from each of said containers through said conduits and receptacle for preheating it, means to alternately arrest said circulation, a combustion device in a conduit leading from said receptacle to each of said return conduits for additionally heating said substances in each of said containers during said circulations, means to withdraw heat from said leading conduit, and means to alternately discharge said combustibly heated contents of each of said containers for expansion.

17. In a combustion product power plant, the combination of a container for a working substance, a heat exchanger having a closed heat receiving receptacle, connection means for said container and receptacle, means for scavenging said container of previously burned substance therein and refilling it with a fresh charge of said working substance, means to circulate said substance of said container through said connections and said receptacle for preheating it, means to arrest said circulation, said container, connection means, and receptacle constituting a closed constant volume, a combustion chamber for said container forming part of said volume for additionally heating within the container the said substance, and means to discharge said combustibly heated contents of said container for expansion for a subsequent said scavenging and refilling of the container.

18. In a combustion product power plant, the combination of a container for a working substance, a heat exchanger having a closed heat receiving receptacle, connection means for said container and receptacle, means for scavenging said container and refilling it with said substance, means to circulate said substance of said container through said connections and said receptacle for preheating it, means to arrest said circulation, said container, connection means, and receptacle constituting a closed constant volume, a combustion chamber for said container forming part of said volume for additionally heating said substance, said combustion device including a continuously functioning heated body for maintaining said substance thereat in continuous combustion, and means to discharge said combustibly heated contents of said container for expansion.

19. In a combustion product power plant, the combination of a container for a working substance, a heat exchanger having a closed heat receiving receptacle, connection means for said container and receptacle, means for scavenging said container of previously burned substance therein and refilling it with a fresh charge of said working substance, means to circulate said substance of said container through said connections and said receptacle for preheating it, means to arrest said circulation, said container, connection means, and receptacle constituting a closed constant volume, a combustion chamber for said container forming part of said volume for additionally heating within the container the said substance, means to withdraw heat from said combustion chamber, and means to discharge said combustibly heated contents of said container for expansion for a subsequent said scavenging and refilling of the container.

20. In a combustion product power plant, the combination of a container for a working substance, a heat exchanger having a closed heat receiving receptacle, connection means for said container and receptacle, means for scavenging said container and refilling it with said substance, means to circulate said substance of said container through said connections and said receptacle for preheating it, means to arrest said circulation, said container, connecting means, and receptacle constituting a closed constant volume, a combustion chamber for said container forming part of said volume for additionally heating said substance, means to withdraw heat from said connection means, and means to discharge said combustibly heated contents of said container for expansion.

21. In a combustion product power plant, the combination of a container for a working substance, a heat exchanger having a closed heat receiving receptacle, connection means for said container and receptacle, means for scavenging said container and refilling it with said substance, means to circulate said substance of said container through said connections and said receptacle for preheating it, means to arrest said circulation, said container, connection means, and receptacle constituting a closed constant volume, a combustion chamber for said container forming part of said volume for additionally heating said substance being located in said connection means between said receptacle and said container to intercept and burn said preheated substance before it reaches said container, said arrest of circulation occurring upon completion of filling of said container with said combustibly heated substance, and means to discharge said combustibly heated contents of said container for expansion.

22. In a combustion product power plant, the combination of a plurality of containers for a working substance, a heat exchanger having a closed heat receiving receptacle, a conduit for each of said containers leading therefrom to said receptacle, a return conduit for each of said containers leading thereto from said receptacle, means for alternately scavenging each of said containers and filling it with said substance, means to alternately circulate said substance from each of said containers through said conduits and receptacle for preheating it, means to alternately arrest said circulation, a combustion device for each of said containers located in its said return conduit leading thereto for additionally heating said substance, and means to alternately discharge said combustibly heated contents of each of said containers for expansion.

WERNER KARRER.
FRANÇOIS PERRENOUD.